United States Patent
Cooley et al.

[11] Patent Number: 6,157,874
[45] Date of Patent: Dec. 5, 2000

[54] POWER CONTROL SYSTEMS AND PROCESSES

[75] Inventors: Edwin Martin Cooley, Rowlett; Donald Tucker, DeSoto; Ray Cumpton, Dallas; John Carlson, Grapevine, all of Tex.

[73] Assignee: Basic Resources, Inc., Dallas, Tex.

[21] Appl. No.: 08/962,309

[22] Filed: Oct. 31, 1997

[51] Int. Cl.[7] .................................................. G05D 11/00
[52] U.S. Cl. ............................ 700/295; 700/286; 700/22
[58] Field of Search ............................... 700/22, 286, 295

[56] References Cited

U.S. PATENT DOCUMENTS

| | | | |
|---|---|---|---|
| 4,620,283 | 10/1986 | Butt et al. | 700/286 |
| 5,631,843 | 5/1997 | Munday et al. | 700/286 |
| 5,696,695 | 12/1997 | Ehlers et al. | 700/295 |

*Primary Examiner*—William Grant
*Assistant Examiner*—Kidest Bahta
*Attorney, Agent, or Firm*—Worsham Forsythe Wooldridge LLP

[57] ABSTRACT

A control system comprises a utility power line; a first meter, a first generator, a second meter and a programmable logic controller. The utility power line provides power. The first meter is positioned to measure power provided by a utility company via the utility power line. The first generator generates additional power. The second meter is positioned to measure power generated by the first generator. The programmable logic controller is in communication with the first meter and the second meter to receive input information. The programmable logic controller is also in communication with the first generator to selectively control the first generator in response to the input information. The programmable logic controller controls the first generator to keep power provided by the utility company via the utility power line below a first amount at a first time. The programmable logic controller also controls load bearing equipment that consumes the power provided via the utility power line and from the first generator. A process of managing power usage of a plant comprises receiving energy pulses; determining actual kWh being delivered by a utility company, during a demand interval; comparing the actual kWh to a preset kWh amount to determine whether actual kWh is greater than the preset kWh amount; and, if the actual kWh is greater than the preset kWh amount, then reducing the amount of power consumed by load bearing equipment. Also, if the actual kWh is greater than the preset kWh amount, then the process increases power generated a generator.

18 Claims, 5 Drawing Sheets

Microfiche Appendix Included
(3 Microfiche, 153 Pages)

POWER CONTROL SYSTEMS AND PROCESSES

© Copyright. 1997. Basic Resources, Inc. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

FIELD OF INVENTION

The present invention generally relates to the field of equipment and processes used to monitor, manage and control power production and consumption of a plant to reduce the fuel and/or energy required to operate power generators and to otherwise reduce fuel consumption of the plant. The present invention particularly relates to systems and processes comprised of programmable logic controllers, meters, control panels or other operator interfaces, and communication lines to variable-load equipment, which are used to adjust the power supplied by a local utility company at certain times throughout the day, week, month, and year.

MICROFICHE APPENDIX

A microfiche appendix is included as part of this Specification and includes three microfiche that have a total of 153 frames. The microfiche appendix includes Appendix A and Appendix B of the Specification and contain computer program listings and a general physical layout of a preferred embodiment.

BACKGROUND

The operation of power generators at various types of plants (e.g., foundries, metal processors, and manufacturing plants) can be improved in a number of ways, particularly during times of peak demand. Utility companies generally charge varying rates for power and/or energy (e.g., electricity) throughout a day, week, month, and year. For instance, in the southern regions of the United States, electricity supplied during the middle of the day in the summer costs more than electricity provided at other parts of the day in the summer. As a result, some larger purchasers of power and/or energy have installed individually owned and operated power generation equipment (e.g., generators) to supplement (and, in some cases, replace) the power and/or energy provided by the local utility company. The management and operation of these individually owned and operated power generation equipment, however, remain a concern, especially when the management and operation are viewed in conjunction with the power and/or energy supplied by the local utility company, the cost of the power and/or energy supplied by the local utility company, and the use of the power and/or energy by the plant. Specifically, as shown in FIGS. 1A and 1B, there is a need to have the ability to control the operation of power generation equipment to supply part of the electrical demand during these certain time periods. FIGS. 1A and 1B illustrate the power consumption over a twenty-four (24) hour period of a plant having at least one furnace and at least one generator when the operation and energy consumption of the furnace(s) and the generator(s) is not actively monitored, managed, and/or otherwise controlled. Note the unpredictable nature of the curve, which is due, in part, to the fact that traditional techniques simply focus on turning equipment "on" and "off," a technique commonly called "duty cycling," to reduce the average demand registered on the utility meter. Consequently, traditional demand controllers cannot take advantage of the variable nature of equipment using the power and/or energy.

SUMMARY

The disclosed invention pertains to an apparatus and to related methods and systems that are used to monitor and control the operation of a plant.

Preferred embodiments are generally comprised of a utility power line, a first meter, a first generator, a second meter, and a programmable logic controller. The first meter is positioned to measure power provided by a utility company via the utility power line. The first generator generates power to supplement (and, in some cases, replace) the power provided by the utility company. The second meter is positioned to measure power generated by the first generator. The programmable logic controller is in communication with the first meter and with the second meter to receive input information. The programmable logic controller is also in communication with the first generator to selectively control the first generator in response to the input information. The programmable logic controller controls the first generator to keep power (or energy) provided by the utility company via the utility power line below a first amount at a first time of a day, week, month, or year (e.g., during periods of peak usage). In addition, the programmable logic controller controls the first generator to keep power provided by the utility company via the utility power line below a second amount at a second time of day, week, month, or year. Further, preferred embodiments can also control load bearing equipment, which generally consumes the power (or energy) provided by the utility company and the first generator. The load bearing equipment is also preferably in communication with the programmable logic controller, so that the programmable logic controller can selectively control the load bearing equipment to keep power (or energy) provided by the utility company via the utility power line below a first amount at a first time and/or below a second amount at a second time. Programmable logic controller in alternate preferred embodiments can also individually control the load bearing equipment by itself, so the programmable logic controller can selectively control the load bearing equipment to keep power (or energy) provided by the utility company via the utility power line below a first amount at a first time and/or below a second amount at a second time.

Once demand data received from a monitoring instrument, such as a utility billing meter, and certain demand set points received from a control panel, such as billing-demand-set-point, are set, preferred methods used to monitor, control and manage the power consumption of specified equipment are generally comprised of (a) monitoring the power (or energy) demand from the equipment; (b) determining if the present rate of energy consumption would result in a billing demand exceeding the specified billing demand set-point; (c) controlling the power output (or energy output) of the generator(s) to ensure that the billing demand does not exceed the billing-demand-set-point; and (d) reducing the kilowatt ("kW") demand of the equipment to maintain the utility billing demand below the billing-demand-set-point when the generator(s) is (are) operating at maximum capacity and the billing demand approaches (or is predicted to exceed) the billing-demand-set-point. The power consumption is preferably monitored through the use of the data received from the utility billing meter as well as from data received from the meters used to measure the power (or energy) supplied by generators.

Preferred embodiments provide a number of advantages, important functions and key features. In particular, preferred embodiments are able to selectively control the power generation equipment, so that the power generation equipment is controlled only during user-selected periods. Preferred embodiments are capable of being switched from auto to manual, and vice versa, at any time to override control signals. Preferred embodiments use control signals to set specific (e.g., maximum) power level(s) at which the power generation equipment is permitted to operate. When a maximum power level is set, preferred embodiments also allow the user to operate at any level below the controller-defined threshold. Preferred embodiments also provide a unique way of handling the operation and power output of the engine generators. By adjusting the generator output to match the need, fuel consumption and generator operational expenses are significantly reduced. No other control system provides either of these features; no other control system combines the generator control and equipment control to accomplish demand control. Preferred embodiments also dynamically control the electrical demand of an induction melting furnace and the electrical output of one or more generators (e.g., diesel-engine driven generators). The control system limits the peak demand seen by the electric utility demand meter and minimizes the fuel required to operate the generators, thereby maximizing the operating cost savings for the user.

Other advantages of the invention and/or inventions described herein will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein.

DETAILED DESCRIPTION OF THE PREFERRED EMBODIMENT

Figure 1A:
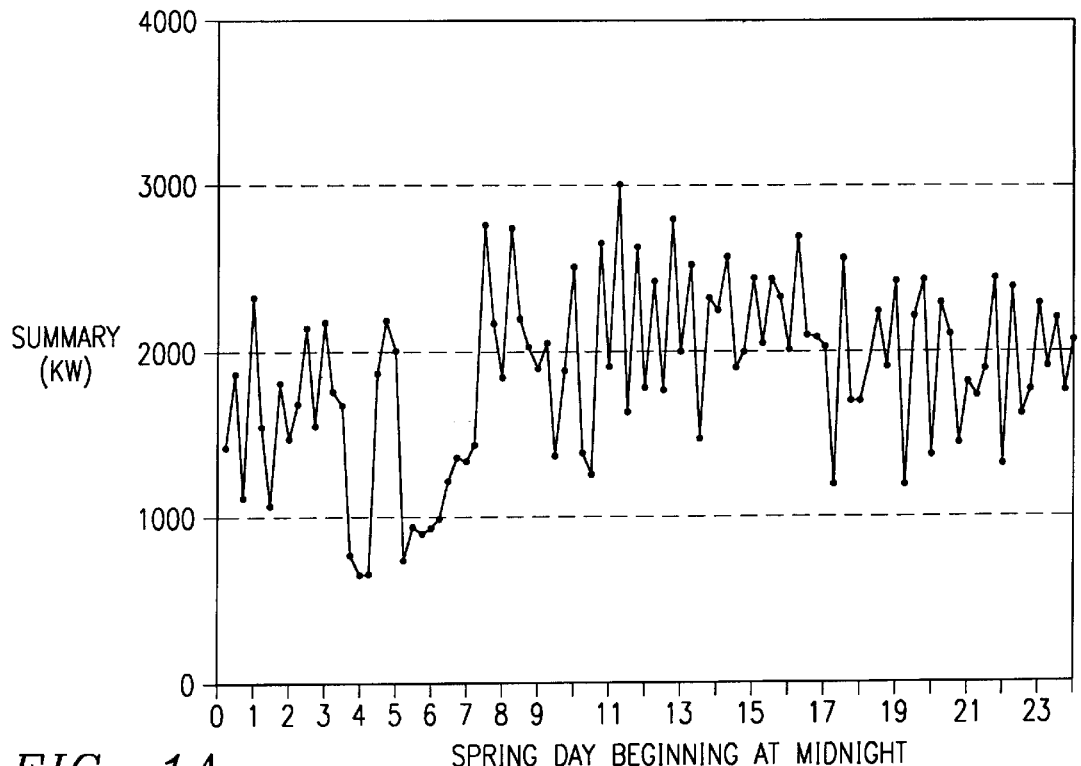
FIGS. 1A and 1B show actual graphs of the power supplied to a plant in which there is no control of the generator(s) used to provide power to the plant and of the load bearing equipment that consumes the power provided to the plant from the generator(s) and/or the utility company.
Figure 1B:
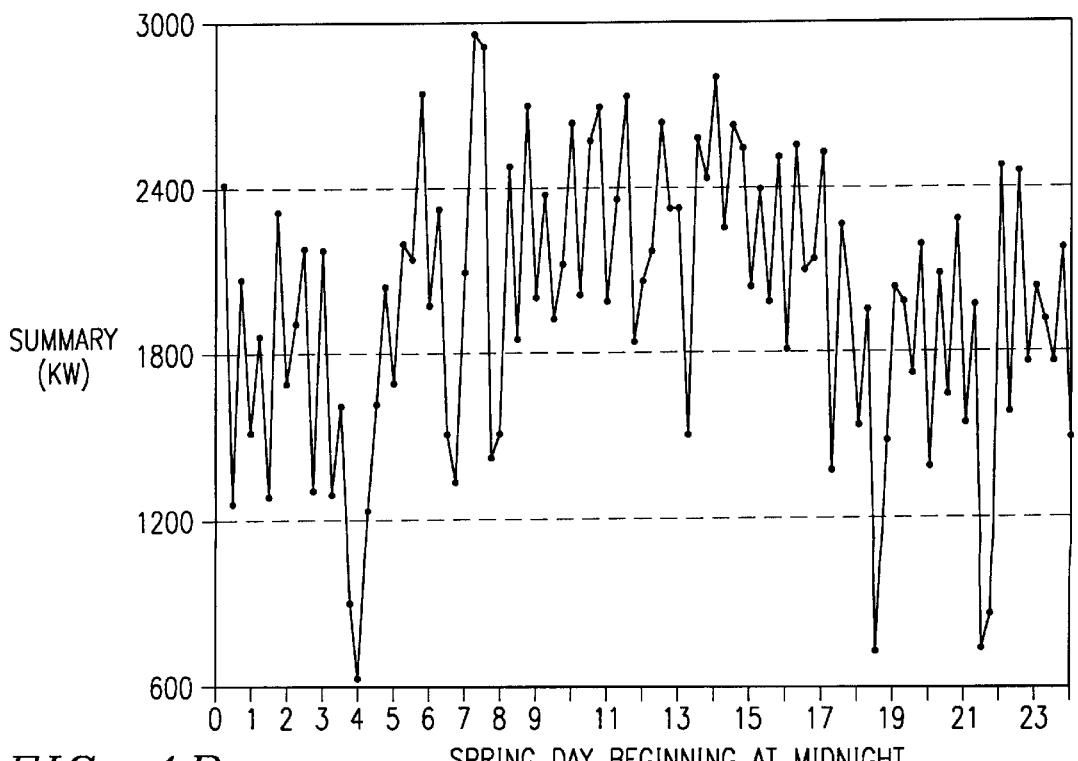

The preferred embodiment will be described by referring to apparatus and methods showing various examples of how the inventions can be made and used. When possible, like reference characters are used throughout the several views of the drawing to indicate like or corresponding parts.

Figure 2A:
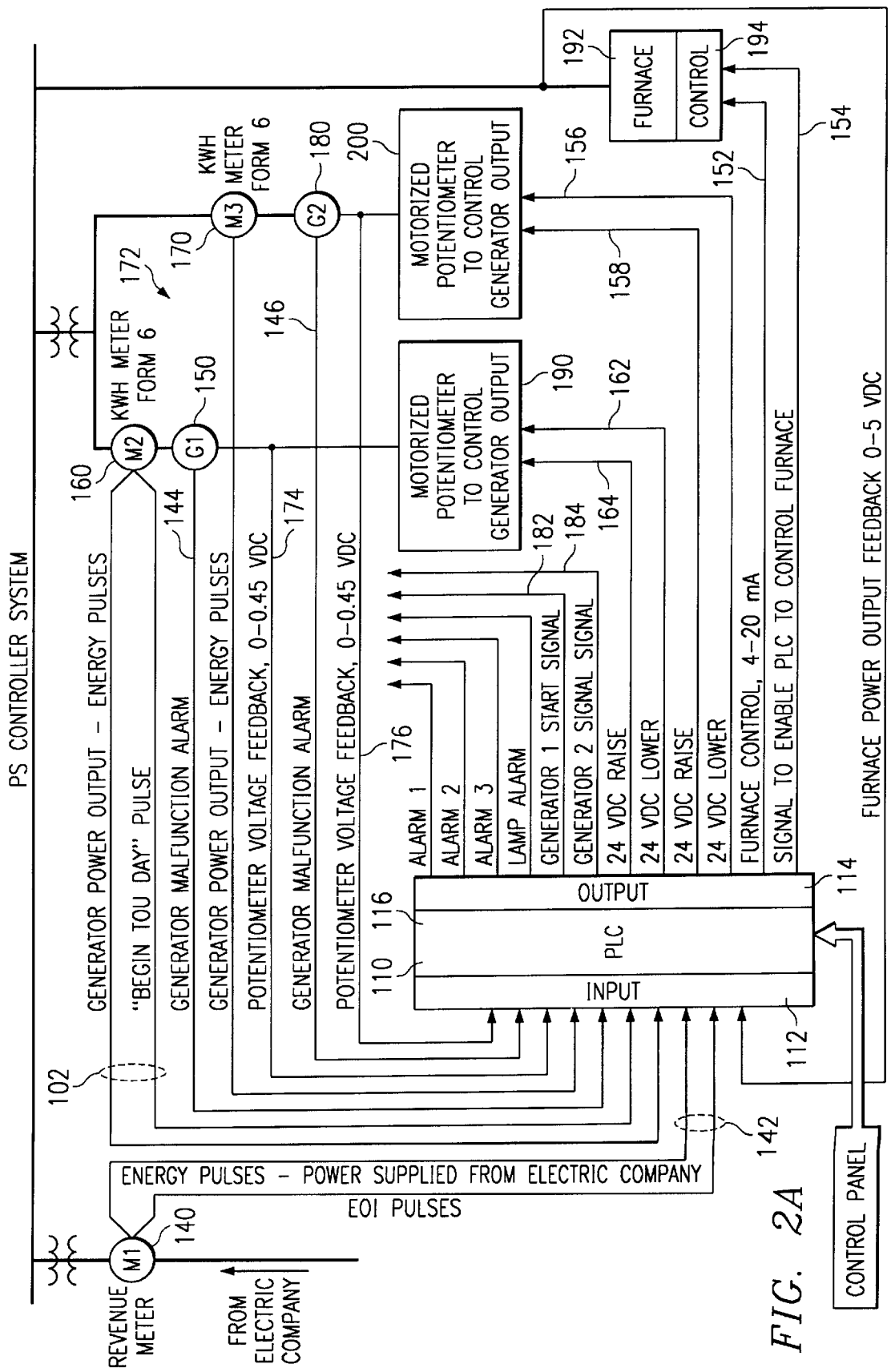
FIG. 2A illustrates a general schematic system diagram of a preferred embodiment 100, which, among other things, shows the general relationship between programmable logic controller 110, first meter 140, second meter 160, third meter 170, first generator 150, second generator 180, and/or load bearing equipment 192.
Figure 2B:
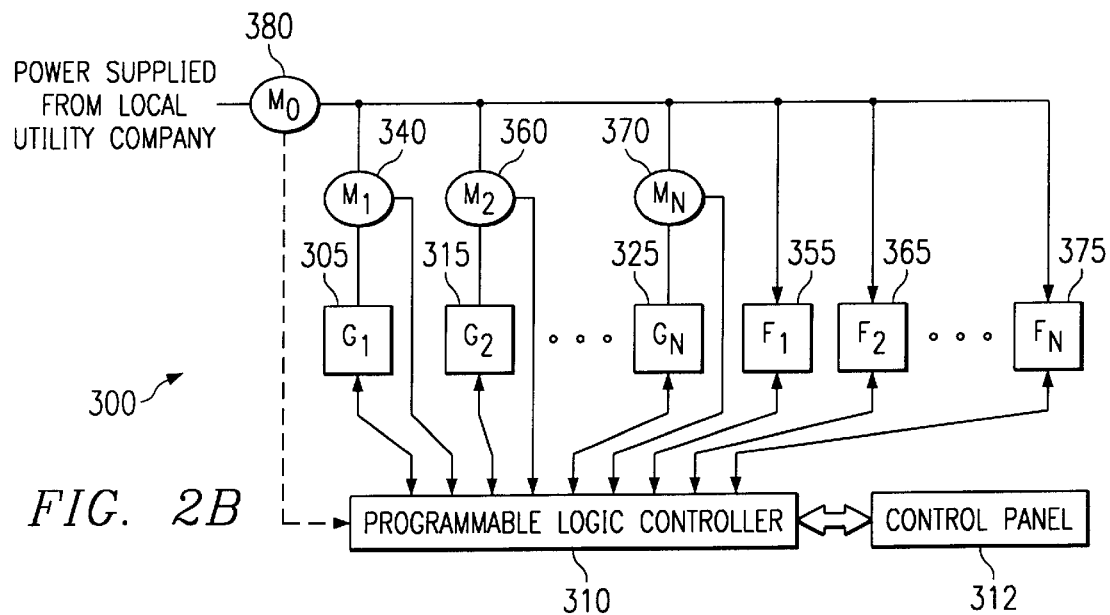
FIG. 2B illustrates a generalized schematic system diagram of a preferred embodiment 300, which, among other things, shows the general relationship between programmable logic controller 310, first meter 340, second meter 360, and nth meter 370, utility meter 380, first generator 305, second generator 315, nth generator 325, first load bearing equipment 355, second load bearing equipment 365, and nth load bearing equipment 375, and/or control panel 312.

A more generalized schematic system diagram of a preferred embodiment is shown in FIG. 2B. Once again, programmable logic controller 310 selectively controls the operation of first generator ($G_1$) 305, second generator ($G_2$) 315, ..., nth generator ($G_N$) 325. Also, programmable logic controller 310 controls the operation of first load bearing equipment ($F_1$) 355 (e.g., an induction furnace), second load bearing equipment ($F_2$) 365, and nth load bearing equipment ($F_N$) 375. First meter ($M_1$) 340 is used to monitor the output generated by first generator 305, second meter ($M_2$) 360 is used to monitor the output generated by second generator 315, and nth meter ($M_N$) 370 is used to monitor the output of nth generator 325 and the utility meter 380 ($M_0$) is used to monitor the power inputted via the power line to the plant. Control monitor 312 is in communication with programmable logic controller 310.

A more specific preferred embodiment showing the relationship between programmable logic controller 110 and a first generator 150 and a second generator 180 and load bearing equipment 192 is shown in FIG. 2A. FIG. 2A will be described in relation to programmable logic controller 110, which is generally divided into three (3) separate modules: input module 112, output module 114, and logic module 116. The detailed information is shown in Appendix B, which is hereby incorporated by reference. Specifically, Appendix B shows the general physical layout of the preferred embodiment inside a cabinet, a chart showing the connections for the terminal strip, a chart showing the descriptions of the terminal strip connections, input connections to the electrical components, and output connections for the electrical components.

Inputs to Input Module 112 of Programmable Logic Controller 110

Input module 112 receives a host of inputs. One such input is from first meter (M1) 140. Specifically, energy pulses (or pulse outputs) are generated by pulse initiator device, Me (not shown), on first meter 140, which preferably is a utility billing meter, and communicated from first meter 140 to input module 112 of programmable logic controller 110 via communication lines 142. The rate of energy pulses created and transferred are proportional to the power, in kW, provided to the customer, to which first meter 140 corresponds by the utility company. $K_e$, the pulse constant, is equal to the number of kilowatt hours ("kWh") per pulse. The value of $K_e$ will depend upon the particular utility metering arrangement. A pulse is issued after the meter recognizes that $K_e$ kWh of energy have "passed" through the meter. Therefore, the average power, over the period of time between two consecutive pulses, is given as: $P=K_e/T$, where T is the elapsed time between two consecutive pulses. The pulses are actually in the form of "dry-contact" closures. An external voltage source is required. See Appendix B for the detailed wiring information. An end-of-interval pulse, which is regulated by an internal clock in first meter 140, is issued by first meter 140 at the end of each demand interval.

Second meter 160 measures the power supplied by first generator (G1) 150. Specifically, energy pulses generated by second meter 160 measure the power and energy supplied by first generator (G1) 150, as $K_e$, the pulse constant, is equal to the number of kWh per pulse. Energy pulses are communicated to input module 112 of programmable logic controller 110 from second meter 160 via communication lines 162. Once again, energy pulses are actually in the form of "dry-contact" closures, which require an external voltage source. See Appendix B for the detailed wiring information.

Third meter 170 measures the power supplied by second generator (G2) 180. Specifically, energy pulses from third meter (M3) 170 are used to measure the power and energy supplied by second generator 180, as $K_e$, the pulse constant, is equal to the number of kWh per pulse. Energy pulses are communicated to input module 112 of programmable logic controller 110 from third meter 170 via communication lines 172. Once again, the pulses are actually in the form of "dry-contact" closures, which requires an external voltage source. See Appendix B for the detailed wiring information.

In addition, equipment demand-level feedback signals are also communicated to input module 112 of programmable logic controller 110 via communication lines 174 and 176. In particular, preferred embodiments use a 0–5 $V_{dc}$ voltage output from the controlled equipment via first and second motorized potentiometers 190 and 200, which indicates the power consumption of the controlled equipment (e.g., first generator 150 and/or second generator 180). First motorized potentiometer 190 controls the output of first generator 150. Second motor potentiometer 200 controls the output of second generator 180. Note these signals are optional and may not be readily available from all types of equipment.

Figure 6:
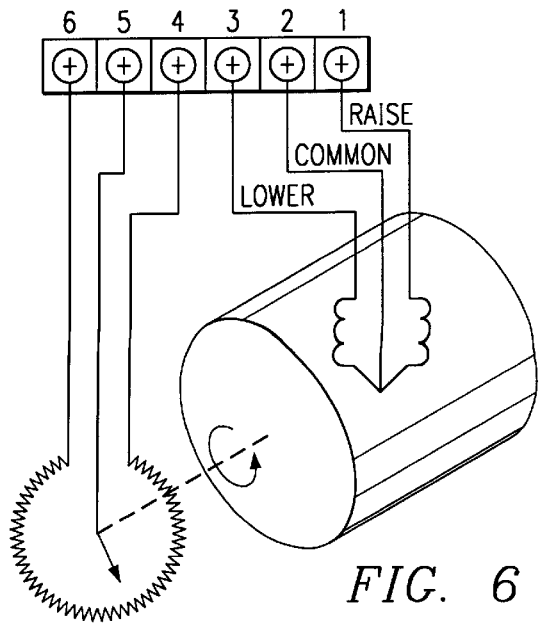
FIG. 6 shows the power reference module, which is comprised of a 1-turn potentiometer driven by a 24-$V_{de}$ motor (RPM adjustable from 0.8–6 rpm).

First generator 150 and second generator 180 in preferred embodiments are equipped with a power reference module which controls the output power level (kW) of the specific generator. As shown in FIG. 6, the power reference module is comprised of a 100-ohm, 1-turn potentiometer driven by a 24-$V_{dc}$ motor (RPM adjustable from 0.8–6 rpm). The potentiometer output voltage ranges from 0–0.451 $V_{dc}$ (i.e., at full scale) the potentiometer voltage output will be 0.451 volts. Of course, varying voltage ranges and potentiometers having varying characteristics can be used in other applications. These signals are provided to control first generator 150 and to second generator 180 and are used to set the power output of first generator 150 and second generator 180. Programmable logic controller 110 monitors these signals to provide the necessary feedback required for it to properly position the motorized potentiometers 190 and 200.

Finally, first and second alarm inputs are inputted from both first generator 150 and second generator 180. In particular, first alarm input from first generator 150 is inputted into input module 112 of programmable logic controller 110 via communication line 144 and second alarm input is inputted into input module 112 of programmable logic controller 110 via communication line 146.

Outputs from Output Module 114 of Programmable Logic Controller 110

Output module 114 of programmable logic controller 110 sends out a host of signals. An equipment demand-limiting control signal is communicated with the controlled equipment, such as furnace 192, via communication line 152 by programmable logic controller 110. For example the maximum operating level (kW) of the controlled equipment of the embodiment shown in FIG. 2A is sent via a 4–20 mA signal to furnace 192 by programmable logic controller 110. Note, in most cases, there is a relationship between maximum equipment demand and the control current. The control current only sets the maximum limit of equipment demand, allowing the equipment to operate at lower power levels as required by the equipment operator or other control systems.

Similarly, an equipment-control enable signal, which corresponds to a "dry-contact" closure, is also communicated to equipment control module 194 via communication line 154.

A "raise" or "increase" power output control signal and/or a "lower" or "decrease" power output control signal is also sent to first generator 150 from output module 114 of programmable logic controller 110. Similarly, a "raise" or "increase" power output control signal and/or a "lower" or "decrease" power output control signal is also sent to second generator 180 from output module 114 of programmable logic controller 110. Each generator is equipped with a power reference module. The output of the power reference module controls the output power level (kW) of that specific generator. The power reference module, which is generally part of a generator package, is comprised of a 1-turn potentiometer driven by a 24-$V_{dc}$ motor (RPM adjustable from 0.8–6 rpm). Programmable logic controller 110 controls the output of a generator (e.g., first generator 150 and/or second generator 180) by running the 24-v motor until the appropriate potentiometer (e.g., first motorized potentiometer 190 and/or second motorized potentiometer 200) is adjusted to the appropriate voltage level. See Appendix B for the detailed wiring information. Note first and second motorized potentiometers 190 and 200 in preferred embodiments can also be operated by manually turning a knob, which can be used to control power output when either first generator controlled by first motorized potentiometer 190 or second generator controlled by second motorized potentiometer 200 is operating in manual mode. In addition, "start" signals for first generator 150 and for second generator 180 are sent via communication lines 182 and 184 respectively.

Alarm signals are also sent via output module 114 of programmable logic controller 110. Specifically, a 24-$V_{dc}$ signal, which is normally off, is used to illuminate a lamp on control panel 210 to indicate any type system error or equipment malfunction. Control panel 210 is in communication with logic module 116 via bidirectional communication line 212. Three 24-$V_{dc}$ signals of output module 114, which are normally off, are provided to the customer for customer's use.

Data Input received from Control Panel 210 to Programmable Logic Controller 110

As mentioned above, control panel 210 is in communication with programmable logic controller 110 via communication line 212. The following constants, variables, and relationships indicated below are necessary for proper operation of the overall control system and are preferably entered into the programmable logic controller 110 via control panel 210 with the help of an operator: (a) Time-Input Data—Current date and time; (b) Input of Operational Set points; and (c) Input of the constants of first meter constants and transducer constants. Note that some of the constants are actually encoded in the software found in Appendix A.

Regarding item (b), the inputs of operational set points include the following points; (i) Billing Demand Set Point, because a major objective of programmable logic controller 110 is to maintain the utility meter's billing demand below a level defined as the Billing Demand Set point; (ii) Equipment Demand limits, such as the minimum and maximum allowable kW demand for the equipment to be controlled (Note programmable logic controller 110 assumes the full 20 mA to be equivalent to the maximum kW and that the control signal relationship to the equipment performance is linear and the minimum demand set-point is the lowest kW signal programmable logic controller 110 will send to the equipment); (iii) Generator Maximum Output, which is the maximum kW output of the generator (Note a linear relationship is assumed from zero to maximum kW in the generator control signal circuit); and (iv) Generator Minimum Output, which is the minimum allowed kW output of the generator (Note the programmable logic controller 110 will not send a signal to the generators for generation lower than this minimum kW).

Regarding item (c), the input of first meter constants and transducer constants include the following items: (i) $K_e$, which indicates the kWh/pulse value of the energy pulses of first meter 140 (ii) $K_e$, of second meter 160; (iii) $K_e$, of third meter 170; (iv) $T_{int}$, which indicates the length of the utility's demand interval, usually specified in minutes, but should be input in units of "seconds" to facilitate the calculations of programmable logic controller 110 and is used in calculations performed in the control process; (v) length of time that programmable logic controller 110 waits (in Diagnostic Routine) for energy pulse to be received from first meter 140 to determine that "NO ENERGY PULSES ARE BEING GENERATED;" (vi) length of time that programmable logic controller 110 waits (in Diagnostic Routine) for a energy pulse to be received from second meter 160 to determine that "NO ENERGY PULSES ARE BEING GENERATED;" (vii) length of time that programmable logic controller 110 waits (in Diagnostic Routine) for a energy pulse to be received from third meter 170 to determine that "NO ENERGY PULSES ARE BEING GENERATED."

Operation of Logic Module 116 of Programmable Logic Controller 110

Figure 3B:
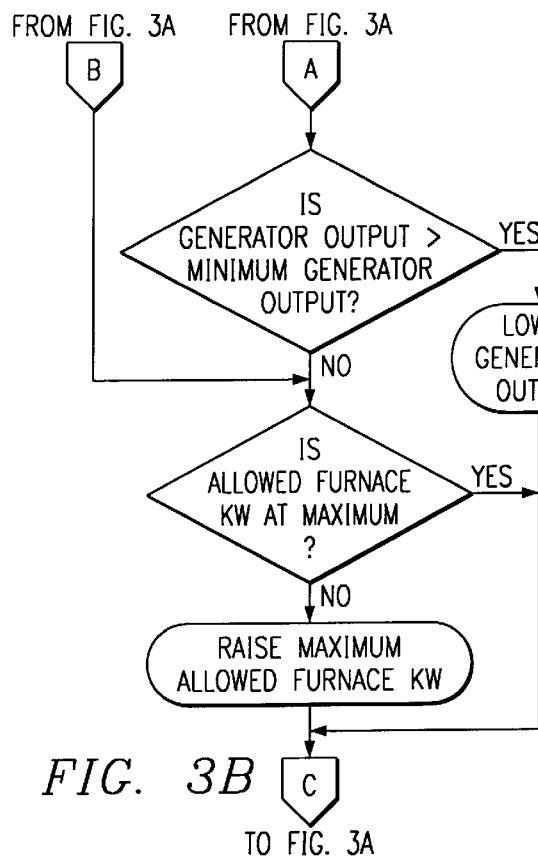
FIGS. 3A and 3B show a flow chart of an operation of preferred embodiment having one generator and one furnace.
Figure 3A:
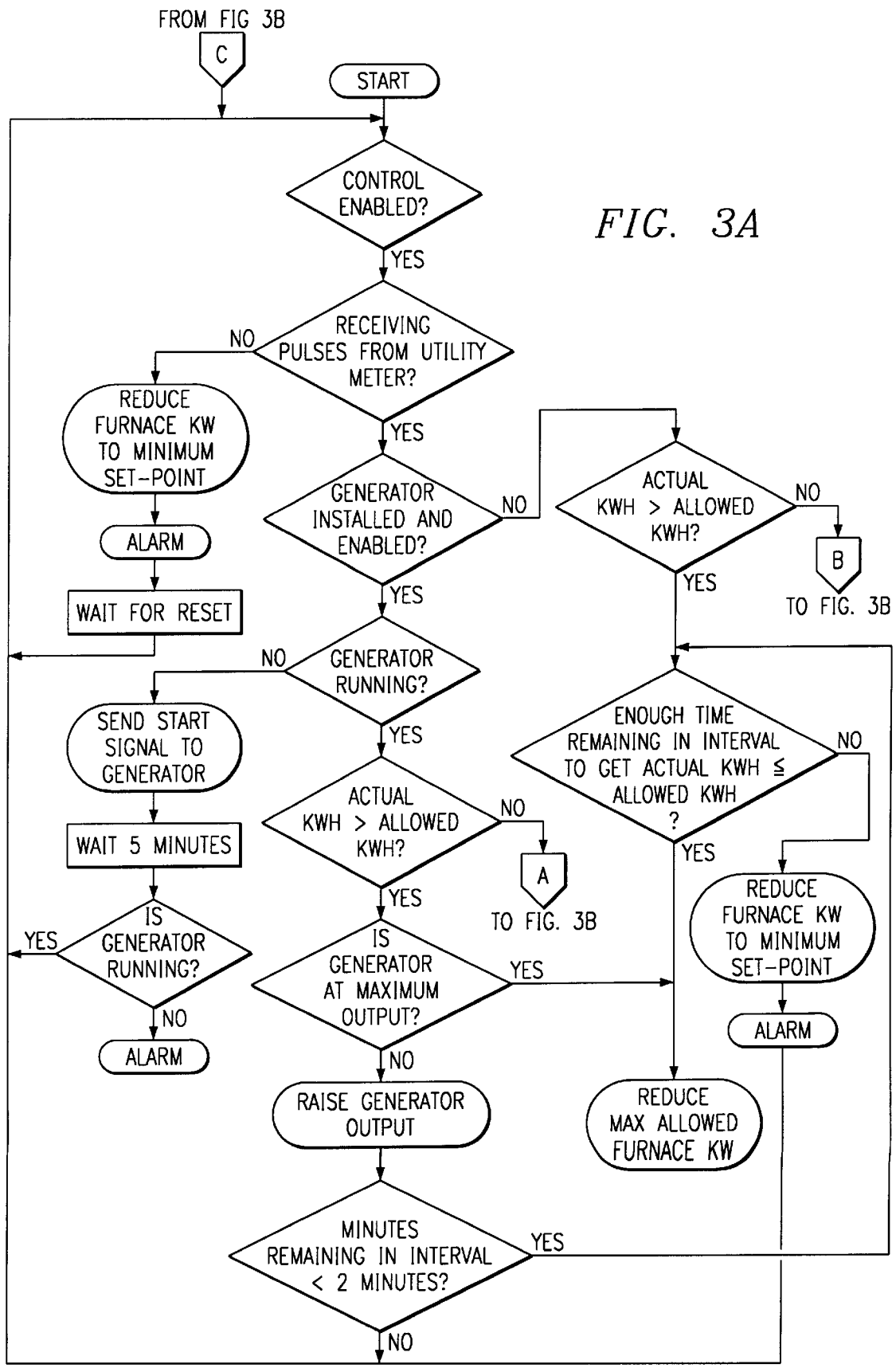

Referring to FIGS. 3A and 3B, a flow chart shows the operation of a preferred embodiment having one generator and one furnace, which is preferably implemented by logic module 116 of programmable logic controller 110 and by the software shown in Appendix A. Specifically, once programmable logic control 110 in FIG. 2A or 310 in FIG. 2B is enabled, preferred embodiments determine whether energy pulses are being received from first meter 140 in FIG. 2A or 340 in FIG. 2B, which is preferably the meter used by the utility company to measure the power delivered to a particular plant. Using this information, preferred embodiments determine the actual kWh being delivered by the utility company. Next, preferred embodiments determines whether actual kWh is greater than the preset, allowed, or preferred kWh. Allowed kwh is generally defined as follows:

$$\text{Allowed kWh} = \frac{(\text{kW maximum demand set point}) \times (\text{\# seconds elapsed in the interval})}{(\text{\# intervals/hour}) \times (\text{\# seconds/interval})}$$

If the generator is installed and enabled and running and the kWh is greater than the present, allowed, or preferred kWh, preferred embodiments raise the power output generated by the generator output. If the kWh is greater than the preset, allowed, or preferred kwh and there is any time remaining in the operation interval to reduce the power consumption of the furnace below the preset, allowed, or preferred kWh, preferred embodiments automatically reduce the amount of power consumed by the furnace by reducing the maximum amount of power that the furnace is allowed to consume. Note that while the control of the generator and furnace can be and preferably are controlled in combination with one another, both the generator and furnace can be controlled independently of one another. If the generator and furnace are controlled in combination with one another, preferred embodiments control or adjust the operation of the generator (i.e., increase the generator output) and then control or adjust the operation of the furnace.

Preferred embodiments have incorporated the code found in Appendix A, which is hereby incorporated by reference, to implement a variation of the flow chart shown in FIGS. 3A and 3B.

Sample Results

Figure 4:
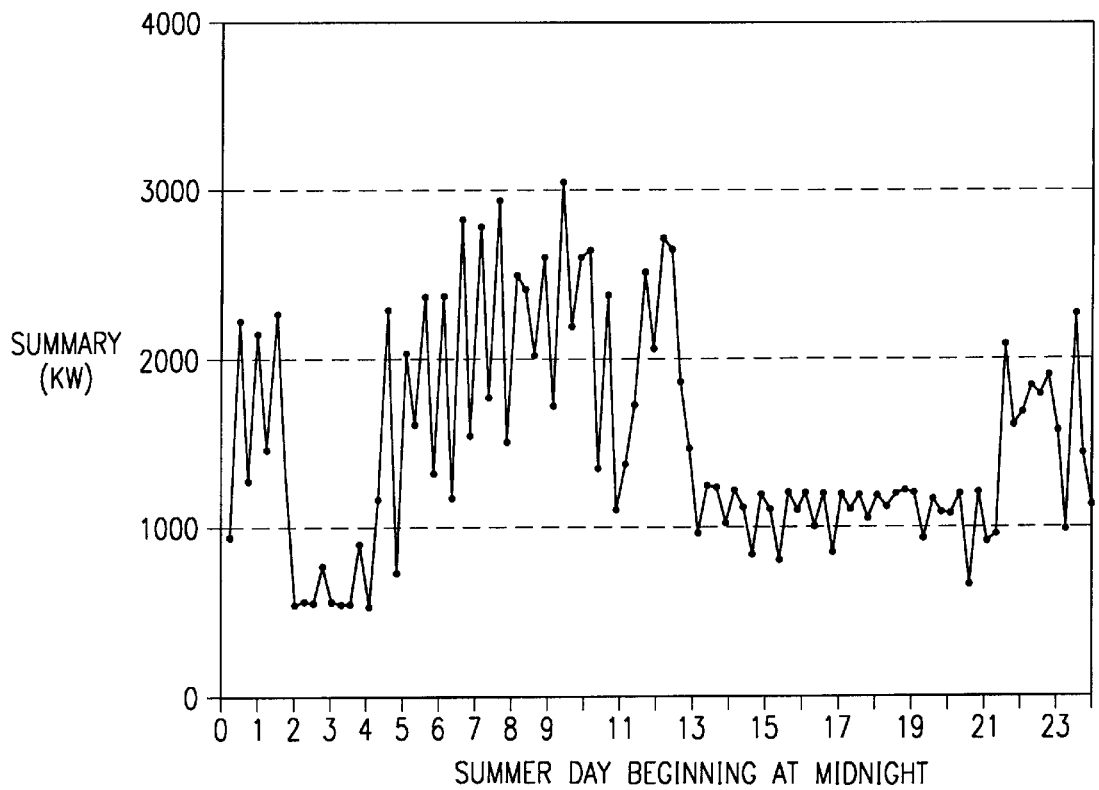
FIG. 4 is an actual graph of the power supplied to a plant in which there is control of the generator(s) used to provide power to the plant and the load bearing equipment that consumes the power provided to the plant from the generator(s) and/or the utility company.

FIG. 4 is an actual graph of the power supplied to a plant by the utility company in which there is control of generator (s) used to provide power to the plant and of the load bearing equipment that consumes the power provided to the plant from generator(s) and/or the utility company. Note that between the hours of 1300 and 2100, the power supplied remains approximately below a set point of 1300.

Figure 5:
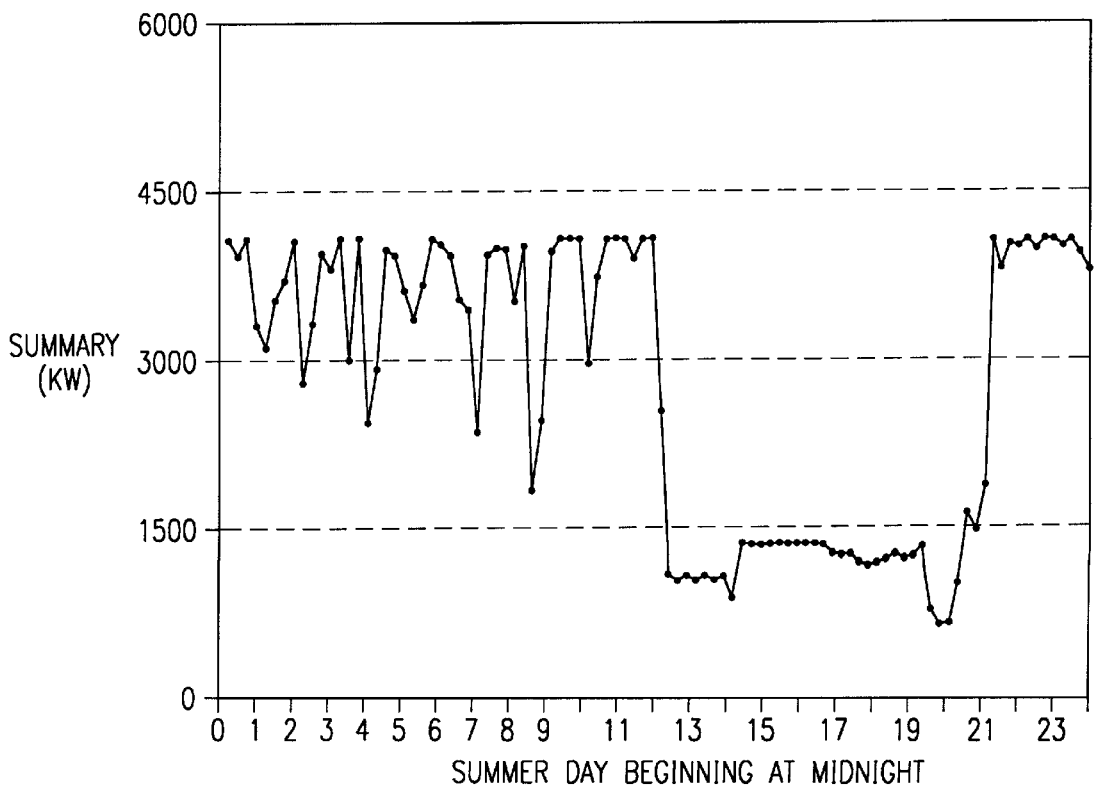
FIG. 5 is an actual graph of the power supplied to a plant in which there is control of the load bearing equipment.

FIG. 5 is an actual graph of the power supplied to a plant in which there is control of the load bearing equipment. Note that between the hours of 1200 and 2100, the power supplied remains approximately below a set point of 1400 and between the hours of 0 and 1200 and 2100 and 2400, the power supplied remains approximately below a set point of 4300.

Further Modifications and Variations

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, as shown in FIG. 2A, preferred embodiments could be used with load bearing equipment, such as an induction furnace, any equipment powered by an A.C. motor with an electronic adjustable speed drive, variable speed drive or variable frequency drive, any equipment powered by a D.C. motor with electronic adjustable speed drive, variable speed drive, with or without engine-generators, and/or any other variable electrical load. Alternatively, preferred embodiments could be used with only one (1) or more load bearing equipment with no generators and/or at least one generator with no load bearing equipment. Also, hardwired or non-programmable controllers can also be used, so long as the functional capabilities are maintained.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to male and use the inventions contained herein. The limits of the inventions and the bounds of the patent protection are measured by and defined in the following claims.

What is claimed is:

1. A power control system, comprising:
   a utility power line operable to supply electrical power to a local load;
   a first meter operable to measure the electrical power supplied by the utility power line to the local load;
   a first generator operable to generate electrical power and supply electrical power to the local load;
   a second meter operable to measure the electrical power generated by the first generator and supplied to the local load; and
   a programmable logic controller operable to receive input information from the first meter and the second meter and to vary the electrical power generated by the first generator based on the input information.

2. The power control system of claim 1, wherein the programmable logic controller is operable to vary the electrical power generated by the first generator to keep the electrical power supplied by the utility power line below a first power level.

3. The power control system of claim 1, wherein the programmable logic controller is operable to vary the electrical power generated by the first generator to keep the electrical power supplied by the utility power line below a first power level during a time interval.

4. The power control system of claim 1, further comprising:
   a variable electrical load operable to receive electrical power from the utility power line and the first generator, the programmable logic controller operable to receive input information from the variable electrical load and to vary the variable electrical load based on the input information.

5. The power control system of claim 4, wherein the programmable logic controller is operable to vary the variable electrical load to keep the electrical power supplied by the utility power line below a first power level.

6. The power control system of claim 4, wherein the programmable logic controller is operable to vary the variable electrical load and to vary the electrical power generated by the first generator to keep the electrical power supplied by the utility power line below a first power level during a first time interval.

7. The power control system of claim 6, wherein the programmable logic controller is operable to vary the variable electrical load and to vary the electrical power generated by the first generator to keep the electrical power supplied by the utility power line below a second power level during a second time interval.

8. The power control system of claim 5, wherein the programmable logic controller is operable to vary the variable electrical load to keep the electrical power supplied by the utility power line below a second power level during a time interval.

9. The power control system of claim 4, wherein the variable electrical load is selected from a group consisting of induction furnace, equipment powered by an A.C. motor with an electronic adjustable speed drive, variable speed drive or variable frequency drive, equipment powered by a D.C. motor with electronic adjustable speed drive, variable speed drive with or without engine-generators, and a variable electrical load.

10. A power control device, comprising:
    a first meter input operable to receive information on the amount of electrical power supplied by a utility power line to a local load;
    a second meter input operable to receive information on the amount of electrical power generated by a first generator and supplied to the local load; and
    a programmable logic controller operable to receive input information from the first meter input and the second meter input and to vary the electrical power generated by the first generator based on the input information.

11. The power control device of claim 10, wherein the programmable logic controller is operable to vary the electrical power generated by the first generator to keep the electrical power supplied by the utility power line below a first power level.

12. The power control device of claim 10, wherein the programmable logic controller is operable to vary the electrical power generated by the first generator to keep the electrical power supplied by the utility power line below a first power level during a time interval.

13. The power control device of claim 10, further comprising:
    a variable electrical load input operable to receive information on the amount of electrical power supplied to a variable electrical load from the utility power line and the first generator, the programmable logic controller operable to receive input information from the variable electrical load input and to vary the variable electrical load based on the input information.

14. The power control device of claim 13, wherein the programmable logic controller is operable to vary the variable electrical load to keep the electrical power supplied by the utility power line below a first power level.

15. The power control device of claim 13, wherein the programmable logic controller is operable to vary the variable electrical load to keep the electrical power supplied by the utility power line below a second power level during a time interval.

16. The power control device of claim 13, wherein the programmable logic controller is operable to vary the variable electrical load and to vary the electrical power generated by the first generator to keep the electrical power supplied by the utility power line below a first power level during a first time interval.

17. The power control device of claim 16, wherein the programmable logic controller is operable to vary the variable electrical load and to vary the electrical power generated by the first generator to keep the electrical power supplied by the utility power line below a second power level during a second time interval.

18. The power control device of claim 13, wherein the variable electrical load is selected from a group consisting of induction furnace, equipment powered by an A.C. motor with an electronic adjustable speed drive, variable speed drive or variable frequency drive, equipment powered by a D.C. motor with electronic adjustable speed drive, variable speed drive with or without engine-generators, and a variable electrical load.

* * * * *